(12) United States Patent
Blom et al.

(10) Patent No.: US 9,232,390 B2
(45) Date of Patent: Jan. 5, 2016

(54) METHODS AND APPARATUSES GENERATING A RADIO BASE STATION KEY IN A CELLULAR RADIO SYSTEM

(75) Inventors: Rolf Blom, Jarfalla (SE); Magnus Lindstrom, Spanga (SE); Karl Norrman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 398 days.

(21) Appl. No.: 12/746,879

(22) PCT Filed: Jul. 1, 2008

(86) PCT No.: PCT/EP2008/058450
§ 371 (c)(1),
(2), (4) Date: Jun. 8, 2010

(87) PCT Pub. No.: WO2009/074356
PCT Pub. Date: Jun. 18, 2009

(65) Prior Publication Data
US 2010/0267363 A1    Oct. 21, 2010

Related U.S. Application Data

(60) Provisional application No. 61/012,814, filed on Dec. 11, 2007.

(51) Int. Cl.
*H04L 29/06* (2006.01)
*H04W 12/04* (2009.01)
*H04J 11/00* (2006.01)
(Continued)

(52) U.S. Cl.
CPC ........... *H04W 12/04* (2013.01); *H04J 11/0069*
(2013.01); *H04L 9/0656* (2013.01); *H04L 2463/061* (2013.01); *H04W 88/08* (2013.01)

(58) Field of Classification Search
CPC .................................................... H04W 12/04
USPC ......................................................... 380/273
See application file for complete search history.

(56) References Cited

U.S. PATENT DOCUMENTS 4,549,308 A * 10/1985 LoPinto ........................ 380/272
5,613,214 A *  3/1997 Shirasawa et al. ............ 455/411
5,724,346 A *  3/1998 Kobayashi et al. ........... 370/329

(Continued)

FOREIGN PATENT DOCUMENTS

EP         1102157 A1     5/2001
JP       200082990 A      3/2000
(Continued)

OTHER PUBLICATIONS

Sanneck, H., et al, 'Context based configuration management of plug & play LTE base stations', 2010 IEEE (NOMS), entire document, http://lteson.com/research/publications/papers/Context%20based%20configuration%20management%20of%20plug%20and%20play%20LTE%20base%20stations_short_final.pdf.*

(Continued)

*Primary Examiner* — Bradley Holder
*Assistant Examiner* — Ronald Baum
(74) *Attorney, Agent, or Firm* — Coats & Bennett, P.L.L.C.

(57) ABSTRACT

In a method and a system for providing secure communication in a cellular radio system radio base station key is generated by determining a set of data bits known to both the UE and the radio base station, and creating the radio base station key in response to the determined set of data.

6 Claims, 6 Drawing Sheets

(51) Int. Cl.
*H04L 9/06* (2006.01)
*H04W 88/08* (2009.01)

(56) References Cited

U.S. PATENT DOCUMENTS

| | | | |
|---|---|---|---|
| 5,805,992 A * | 9/1998 | Schellinger | 455/411 |
| 5,850,445 A * | 12/1998 | Chan et al. | 380/247 |
| 6,463,290 B1 * | 10/2002 | Stilp et al. | 455/456.1 |
| 6,587,680 B1 * | 7/2003 | Ala-Laurila et al. | 455/411 |
| 6,894,992 B1 | 5/2005 | Morvan et al. | |
| 6,950,521 B1 | 9/2005 | Marcovici et al. | |
| 7,389,412 B2 * | 6/2008 | Sharma et al. | 713/153 |
| 7,590,246 B2 * | 9/2009 | Calmels et al. | 380/270 |
| 7,609,837 B2 * | 10/2009 | Bennett | 380/262 |
| 7,653,197 B2 | 1/2010 | Van Dijk | |
| 7,676,041 B2 | 3/2010 | Horn et al. | |
| 7,733,836 B2 * | 6/2010 | Huseth | 370/338 |
| 7,739,402 B2 * | 6/2010 | Roese | G01S 5/02 709/242 |
| 7,747,021 B2 * | 6/2010 | Lindteigen et al. | 380/274 |
| 7,900,039 B2 * | 3/2011 | Shim et al. | 713/151 |
| 7,936,880 B2 * | 5/2011 | Huang et al. | 380/272 |
| 8,027,304 B2 * | 9/2011 | Forsberg | 370/331 |
| 8,249,553 B2 * | 8/2012 | Bosch et al. | 455/410 |
| 2002/0032855 A1 * | 3/2002 | Neves et al. | 713/154 |
| 2003/0109256 A1 * | 6/2003 | Holcman | 455/436 |
| 2004/0165551 A1 * | 8/2004 | Krishnamurthi | H04L 45/741 370/328 |
| 2004/0203787 A1 | 10/2004 | Naghian | |
| 2005/0003797 A1 * | 1/2005 | Baldwin | 455/404.1 |
| 2005/0005095 A1 | 1/2005 | Meandzija et al. | |
| 2005/0100165 A1 | 5/2005 | Rose et al. | |
| 2005/0154925 A1 * | 7/2005 | Chitrapu et al. | 713/202 |
| 2005/0163078 A1 * | 7/2005 | Oba et al. | 370/331 |
| 2005/0261012 A1 * | 11/2005 | Weiser | 455/466 |
| 2005/0276418 A1 * | 12/2005 | Hagiwara | 380/270 |
| 2005/0282548 A1 * | 12/2005 | Kim et al. | 455/436 |
| 2006/0002345 A1 * | 1/2006 | Lapraye | 370/331 |
| 2006/0003775 A1 * | 1/2006 | Bull et al. | 455/456.1 |
| 2006/0083200 A1 * | 4/2006 | Emeott et al. | 370/331 |
| 2006/0133409 A1 | 6/2006 | Prakash et al. | |
| 2006/0276168 A1 * | 12/2006 | Fuller et al. | 455/404.2 |
| 2007/0003062 A1 * | 1/2007 | Mizikovsky et al. | 380/270 |
| 2007/0036353 A1 * | 2/2007 | Reznik et al. | 380/30 |
| 2007/0154016 A1 * | 7/2007 | Nakhjiri | H04L 63/06 380/270 |
| 2007/0230707 A1 * | 10/2007 | Blom et al. | 380/277 |
| 2008/0020749 A1 * | 1/2008 | Delaveau et al. | 455/423 |
| 2008/0039141 A1 * | 2/2008 | Claussen et al. | 455/561 |
| 2008/0070577 A1 * | 3/2008 | Narayanan et al. | 455/436 |
| 2008/0076430 A1 * | 3/2008 | Olson | 455/440 |
| 2010/0023316 A1 | 1/2010 | Knowles et al. | |
| 2013/0028421 A1 * | 1/2013 | Feng et al. | 380/270 |
| 2013/0128866 A1 * | 5/2013 | Zhang et al. | 370/331 |

FOREIGN PATENT DOCUMENTS

| | | |
|---|---|---|
| JP | 2002084276 A | 3/2002 |
| JP | 2005531958 A | 10/2005 |
| JP | 2005536133 A | 11/2005 |
| JP | 2006518121 A | 8/2006 |
| JP | 2007510349 A | 4/2007 |
| JP | 2007511172 A | 4/2007 |
| JP | 2009531954 A | 9/2009 |
| WO | 2005122438 A1 | 12/2005 |
| WO | 2006085207 A1 | 8/2006 |
| WO | 2007005309 A1 | 1/2007 |
| WO | 2007111557 A1 | 10/2007 |
| WO | 2008113804 A1 | 9/2008 |

OTHER PUBLICATIONS

Sanneck, H., et al, 'Context based configuration management of plug & play LTE base stations', 2010 IEEE (NOMS), entire document, http://sanneck.net/research/publications/papers/Context%20based%20configuration%20management%20of%20plug%20and%20play%20LTE%20base%20stations_short_final.pdf.*

Hamza, A., et al, '4G++: Advanced Performance Boosting Techniques in 4th Generation Wireless Systems', Oct. 12, 2011, D4.1: Inter-Cell Interference Coordination, Rev 1.0, http://www.4gpp-project.net/attachments/section/4/WP4_ICIC_v3.pdf.*

3rd Generation Partnership Project. "Re-keying for Prepared eNode Bs." 3GPP TSG SA WG2 Security—S3 SAE/LTE IMS Adhoc, S3a070975, Sophia Antipolis, France, Dec. 11-13, 2007.

3rd Generation Partnership Project. "KeNB Handling During Intra- and Inter-eNB Handovers." 3GPP TSG SA WG3 Security—S3#49bis, S3-070960, Sophia Antipolis, France, Dec. 11-13, 2007.

3rd Generation Partnership Project. "Key Refresh in SAE/LTE." 3GPP TSG SA WG3 Security—SA3#46b, S3-070234, Sophia Antipolis, France, Mar. 28-29, 2007.

3rd Generation Partnershihp Project. 3GPP TR 33.821, V0.5.0 (Oct. 2007). 3rd Generation Partnership Project; Technical Specification Group Services and System Aspects; Rationale and track of security decisions in Long Term Evolved (LTE) RAN/3GPP System Architecture Evolution (SAE) (Release 8). Oct. 2007.

Li, H., et al., "An Anchor-Based Routing Protocol with Cell ID Management System for Ad Hoc Networks", IEEE; 14th International Conference on Computer Communications and Networks, Oct. 17-19, 2005, pp. 215-222, Lexington, KY, USA.

Zugenmaier, A., et al., "Technology Reports SAE Standardization Technology Security Technology for SAE/LTE", NTT DOCOMO Technical Journal, The Telecommunications Association, vol. 17, No. 3, Oct. 1, 2009, pp. 27-30, Japan.

Huawei, "comments to 'Key refresh in SAE/LTE'", 3GPP TSG SA WG3 Security—SA3#46b, Mar. 28-29, 2007, Sophia Antipolis, S3-070272.

Nokia Siemens Networks, et al., "Key refresh on intra-MME handovers", 3GPP TSG SA WG3 Security—SA3#47, May 22-25, 2007, Tallinn, Estonia, S3-070306.

Motorola, "A method to Derive New Keys at Handover in LTE", 3GPP TSG WG3 (Security) Meeting #S3-ah-26418, Mar. 28, 2007, pp. 1-9, Tdoc S3-070253, 3GPP, Sophia-Antipolis, France.

Third Generation Partnership Project. "comments to 'Key refresh in SAE/LTE'." 3GPP TSG SA WG3 Security—SA3#46b S3-070272; Mar. 28-29, 2007; pp. 1-7, Sophia Antipolis, France.

* cited by examiner

METHODS AND APPARATUSES GENERATING A RADIO BASE STATION KEY IN A CELLULAR RADIO SYSTEM

TECHNICAL FIELD

The present invention relates to a method and a device for providing secure communication in a cellular radio system.

BACKGROUND

The evolved packed system (EPS) is a standardized cellular telecommunication standard, standardized within the Third Generation Partnership Project (3GPP). EPS is a part the long-term evolution (LTE) of third-generation cellular systems designed to meet demands for higher user bit rates. Within the EPS, Access Stratum (AS) traffic is protected by cryptographic means. In particular the user plane is confidentiality protected and the Radio Resource Control (RRC) signaling is both confidentiality and integrity protected. The keys used for providing encryption are derived from a cryptographic key called K_eNB.

At handovers of mobile station, also referred to as User Equipment (UE), from one base station the K_eNB of an originating source base station is transformed in the source evolved Node B (eNB), i.e. the base station into a transformed key called K_eNB* before it is delivered to the target eNB. Presently, the target eNB transforms the K_eNB* together with a user target eNB Cell Radio Network Temporary Identifier (C-RNTI). Hereby it is possible to provide continued encryption between the UE and the target base station using the transformed cryptographic key.

Furthermore it has been decided that not only the intended target cell should be prepared to accept a particular mobile station but also other base stations shall be able to do so. The underlying reason is to help recover from radio link failure, and in particular failed handovers. To facilitate acceptance by other base stations besides the target base station, the source base station eNB sends key information and a Terminal Identity Token (TeIT) to the set of "to-be-prepared" base stations. Typically the source base station eNB sends key information and a Terminal Identity Token (TeIT) to base stations located close to the target base station and/or close to the source base station. However, if the same security token is shared by all eNBs in the to-be-prepared set, any one of those could masquerade as the mobile station, at least until AS protection is enabled.

A problem within the existing proposed standard is that the same transformed key K_eNB* should not be used by all base stations as this would allow all base stations in the to-be-prepared set to generate the K_eNB finally used by the base station after hand over, see the contribution to SA3, Td S3a070975. One proposed solution is that the system generates initial data which is used in transformation of K_eNB for a given base station eNB in the to-be-prepared set of base stations. This initial data is then forwarded together with the corresponding base station key K_eNB to the base station eNB. Also, the document "Key refresh in SAE/LTE, S3-070234", XP-002445697 describes a method where data is sent over the air-interface to generate input when generating a new base station key.

However, there exists a constant demand to reduce complexity and enhance security in existing telecommunication systems. Hence there exists a need for an improved method for providing secure communication in a cellular radio system.

SUMMARY

It is an object of the present invention to provide an improved method for providing secure communication in a cellular radio system.

This object and others are obtained by the method, radio system node and User Equipment and as set out in the appended claims. Thus, by creating a radio base station key and/or a Terminal Identity Token using data known to both the mobile station and the radio base station a secure communication can be established and enhanced without having to provide for additional security network components or additional signaling.

In accordance with one embodiment a derived radio base station key in a cellular radio system is generated. The derived radio base station key is created in response to a determined set of public data bits and an existing cryptographic key used for secure communication between a radio base station and a User Equipment. The public data can for example be data bits associated with the Radio Access Technology such as data bits identifying the physical cell identity. Hereby a cryptographic base station key specific for each radio base station is derived for each radio base station thereby increasing the security in the system. Moreover the specific cryptographic key(s) can be derived without additional signaling and/or need for generating specific input data when deriving a cryptographic key being specific for each radio base station, which reduces the complexity and provides a high level of security.

In accordance with one embodiment a Terminal Identity Token for identifying a User Equipment, UE, connected to a radio base station in a radio system is created. The UE is adapted to communicate with the radio system via a secure communication associated with an existing encryption key. When creating the Terminal Identity Token a set of data bits known to both the UE and the source radio base station is determined. The Terminal Identity Token is then generated in response to the determined set of data bits, the terminal identity and the existing key. Hereby a Terminal Identity Token is derived that is specific for each radio base station thereby increasing the security in the system.

In accordance with one embodiment a method of identifying a User Equipment, UE, in a radio system is provided. The UE communicates with the radio system via a secure communication associated with an existing encryption key. A first Terminal Identity Token is generated in a radio base station to which the User Equipment is currently connected. The first Terminal Identity Token is then distributed to a number of other radio base stations of the radio system. A second Terminal Identity Token is also generated in the User Equipment. The second token is transmitted to one of the other radio base stations. When the second token is received by a radio station the UE is identified by comparing the first and second Terminal Identity Token. Both the first and second Terminal Identity Tokens are created in response to the terminal identity and the existing key. Hereby a terminal dropping a connection can reconnect to the system via a secure identification procedure.

The present invention also extends to nodes and User Equipments adapted to implement the methods in as set out above.

Using the methods, nodes and User Equipments in accordance with the invention will provide a more efficient and secure procedure for providing secure communication in a radio system. This is obtained by using data available for the radio base station and the User Equipment when deriving a cryptographic key or a Terminal Identity Token.

BRIEF DESCRIPTION OF THE DRAWINGS

The present invention will now be described in more detail by way of non-limiting examples and with reference to the accompanying drawings, in which.

DETAILED DESCRIPTION

In the following reference in the exemplary embodiments described will be made to an LIE system. However, the invention is not limited to an LTE system but is applicable to any radio system using radio base station keys for protecting data transmitted to and from a mobile station associated with the radio base station.

Figure 1:
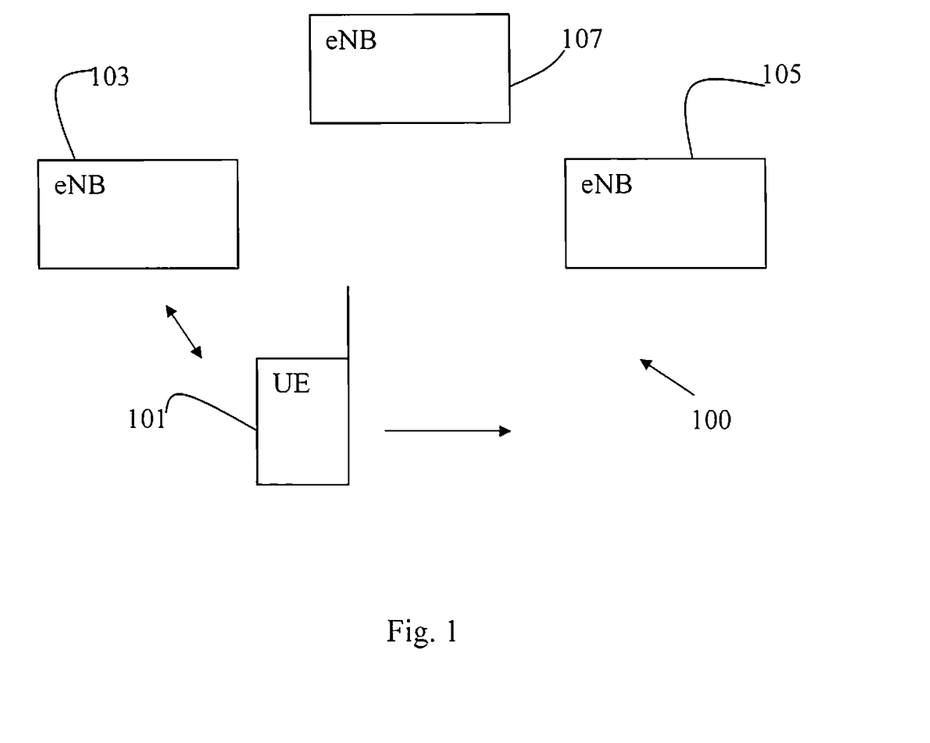
FIG. 1 is a view illustrating a cellular radio system.

In FIG. 1 a schematic view of a cellular radio system 100 providing encrypted communication for a mobile station also termed User Equipment (UE) 101 is shown. The UE 101 transmits and receives data to and from a radio base station 103. In the case when the cellular radio system is an LTE system the radio base station 103 is commonly termed evolved NodeB (eNB). When the UE 101 moves around in the geographical area covered by the cellular radio system 100 it will sometimes be necessary to hand over the connection from one radio base station to another radio base station. Also sometimes the UE may drop the connection to the cellular radio system 100 and may then need to reconnect to the cellular radio system. In both these scenarios it is desired to maintain a secure connection between the cellular radio system 100 and the UE 101.

In case the UE moves from an area covered by the radio base station 103 towards an area covered by a radio base station 105 the cellular radio system prepares for a handover from the source radio base station 103 to the target radio base station 105. Also because it can sometimes be difficult to predict which radio base station that a mobile station 101 will be handed over to a number of other radio base stations may also be prepared for handover. The "be prepared" radio base stations are FIG. 1 represented by a single radio base station 107.

During handover a new radio base station key needs to be derived that can be used for continued secure communication between the mobile station 101 and the radio base station 105, 107 to which the connection is transferred after handover. The new base station key can be termed a transformed or derived base station key. In the case the cellular radio system is an LTE system the transformed key can be labeled K_eNB*.

In accordance with one aspect of the present invention, the information for creating unique transformed base station key K_eNB* in the to-be-prepared set can be based on the least significant bits of an identity which is known by (or is made known to) both the mobile station UE and the radio base station eNB. For example the nine-bit Evolved Universal Mobile Telecommunications System (UMTS) Terrestrial Radio Access Network (E-UTRAN) physical cell identity, here denoted PhyCell_ID can be used or some other cell specific data determined by the Radio Access Technology (RAT) context. The transformation can in accordance with one embodiment make use of a Pseudo-Random Function (PRF) or a hash function with source base station key K_eNB and the cell data such as the PhyCell_ID bits as input. Also other input parameters can be included. Examples of other parameters can be C-RNTI or any other user specific information, data identifying when the key can be used, etc.

The mobile station will know the PhyCell_ID bits from its Radio Access Technology (RAT) context. In the exemplary embodiment above the derivation of a target base station key K_eNB* for a given base station eNB with PhyCell_ID can in one exemplary embodiment be written as:

$$K\_eNB^* = PRF(K\_eNB\_Source), PhyCell\_ID\ bits, Other\_parameters)$$

In accordance with another aspect of the present invention, a Terminal Identity Token TeIT can be formed in a corresponding way and be made unique per base station eNB. i.e. it can also be derived by applying a PRF on the mobile station identity, the base station key K_eNB of the source and the PhyCell_ID bits of the receiving base station eNB. Also other input parameters can be included. Examples of other parameters can be C-RNTI or any other user specific information, data identifying when the key can be used, etc.

Furthermore, when a mobile station is required to prove its identity it can be adapted to generate the corresponding identity token. This can typically be the case during handover when the User Equipment connects to a new radio base station and the system needs to verify the identity of the User equipment or if the connection to a User Equipment is dropped and the User Equipment needs to re-connect to the system.

In accordance with one embodiment a Terminal Identity Token 1 (TeIT1) can be defined as:

$$TeIT1 = PRF(K\_eNB\_Source, Terminal\_ID, PhyCell\_ID\ bits, Other\_parameters)$$

Figure 2:
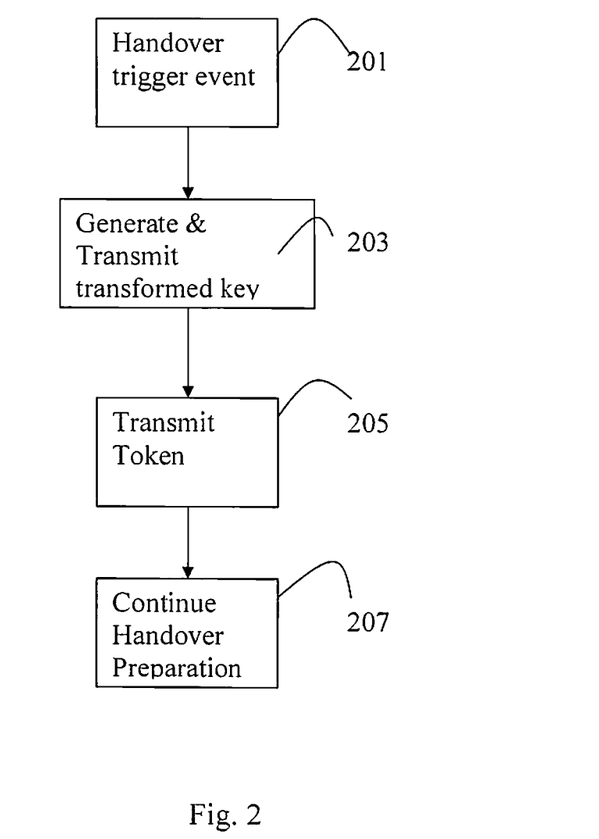
FIG. 2 is a flow chart illustrating steps performed in a procedure for creating a radio base station key.

In FIG. 2 a flow chart illustrating steps performed when generating a base station encryption key for a secure connection between a mobile station 101 and a cellular radio system 100 when the secure connection is handed over from one source radio base station 103 to a target radio base station 105, 107 is shown. First in a step 201, the system detects that there may be a handover. For example the system may determine that the mobile station 101 is close to the cell border of the source radio base station based on radio measurements. Next, in a step 203 the source radio base station generates and transmits a transformed Base station Key to the target base station 105. In step 203 the source base station 103 can also send a transformed Base station Key to a set of "be prepared" radio base stations 107. The transformed base station Key can be derived in accordance with the above. In accordance with one embodiment the source base station also transmits a Terminal Identity Token in a step 205. The Terminal Identity Token can for example be a token generated as the token TeIT1 as described above. Thereupon handover can be performed in a conventional manner as indicated by step 207.

In accordance with another embodiment of the present invention the source base station eNB can be adapted to distribute a common token, TeIT3, to all base stations in the to-be-prepared set. This token can be the output from a PRF applied to the output from a second PRF, which takes at least the terminal identity and K_eNB as input. Also other input parameters can be provided. Examples of other parameters can be C-RNTI or any other user specific information, data identifying when the key can be used, etc.

In accordance with one exemplary embodiment, when a mobile station transmits its identity token information, TeIT2, it transmits the PRF of the terminal identity and the base station key K_eNB. The receiving base station can apply the outer PRF on the TeIT2 received from the terminal and compare the outcome against the identity token, i.e. the TeIT3 received from the source base station. If the two entities correspond, the terminal identity is determined to have been established. Expressed differently the Terminal Identity Tokens 2 an 3 can be written:

$$TeIT2 = PRF(K\_eNB\_Source, Terminal\_ID, Other\_parameters)$$

$$TeIT3 = PRF(TeIT2, Other\_parameters2)$$

A comparison in a base station of TeIT2 received from mobile station and TeIT3 received from source eNB can be performed as follows:

$$TeIT3 = ? = PRF(TeIT2, Other\ parameters2),$$

where =?= denotes a comparison operation.

In the above descriptions the Terminal_ID can for example be the C-RNTI assigned to the terminal in the source base station eNB or any other user specific information, data identifying when the key can be used, etc.

Thus if for example a connection for a UE 101 is dropped and the UE 101 needs to reconnect to the cellular radio system 100, all the radio base stations having access to the TeIT3 identity token information can verify the authenticity of a mobile station transmitting the identity token TeIT2.

In accordance with one embodiment the transformed base station key K_eNB* for the target base station eNB can be derived in the same way as for the radio base station eNBs in the to-be prepared set. The target base station eNB can then receive the same type of information as all other prepared base stations eNBs as the hand over may fail and the mobile station will then try to reconnect to the intended target base station eNB.

Figure 3:
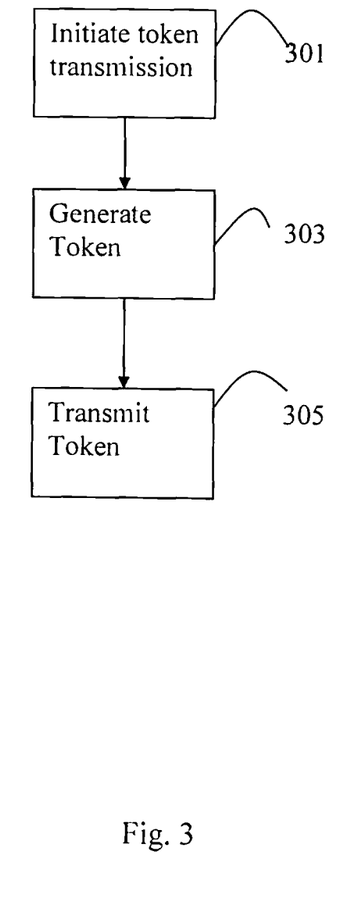
FIG. 3 is a flow chart illustrating steps performed in a source radio base station when preparing for verifying the authenticity of a moving mobile station.

In FIG. 3 a flowchart illustrating steps performed in a source radio base station when preparing for verifying the authenticity of a moving mobile station is shown. First in a step 301 a source radio base station determines to transmit a terminal identity token to a number of other radio base stations. The reason for transmitting the terminal identity token may for example be that there is a handover procedure in progress. The terminal identity token can for example be generated as the TeIT3 token described above in a step 303. Next, the token is transmitted to the other radio base stations in a step 305. The other radio base stations can typically be adjacent radio base stations, which the mobile station is likely to connect to in the near future.

Figure 4:
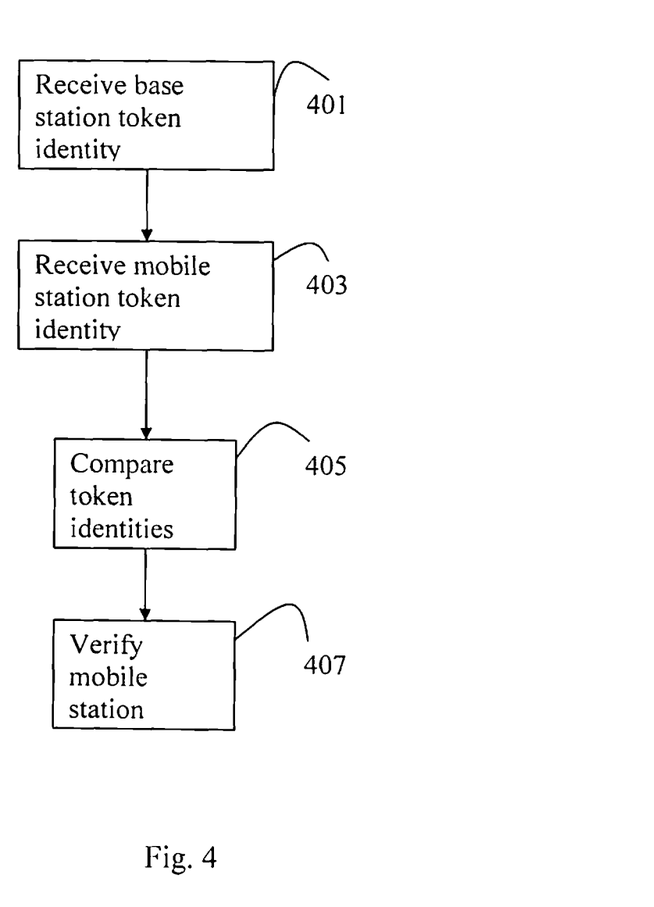
FIG. 4 is a flowchart illustrating steps performed in a target radio base station when verifying the authenticity of a mobile station.

In FIG. 4 a flowchart illustrating steps performed in a target radio base station when verifying the authenticity of a mobile station. First in a Step 401 the target radio base station receives a token identity TeIT3 from a source radio base station. Next, in a step 403, the target radio base station receives a terminal identity token TeIT2 from a mobile station. Thereupon, in a step 405 the target base station compares the token identity TeIT3 with the terminal token identity TeTI2. Finally, in a step 407 the target radio base station verifies the authenticity of the mobile station based on the comparison in step 405.

Figure 5:
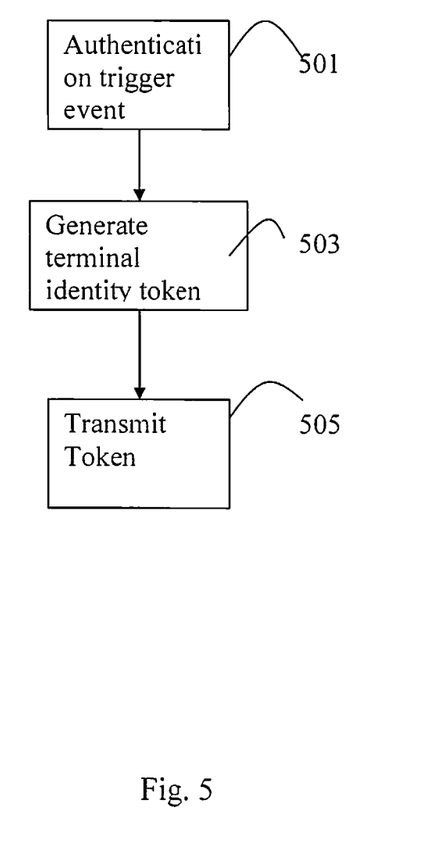
FIG. 5 is a flow chart illustrating steps performed in a mobile station when verifying the authenticity of the mobile station to a cellular radio system.

In FIG. 5 a flow chart illustrating steps performed in a mobile station when verifying the authenticity of the mobile station to a cellular radio system. First, in a step 501, the mobile station is triggered to send an authentication message. For example during handover or when a connection is dropped the mobile station may need to (re-) authenticate itself to a radio base station of the cellular radio system. Next in a step 503, the mobile station generates a terminal identity token. The terminal identity token can be generated as the terminal identity token TeIT2 described above. Finally, the mobile station transmits an authentication message to a radio base station of the cellular radio network in a step 505 based on which the cellular radio system can authenticate the mobile station.

Figure 6:
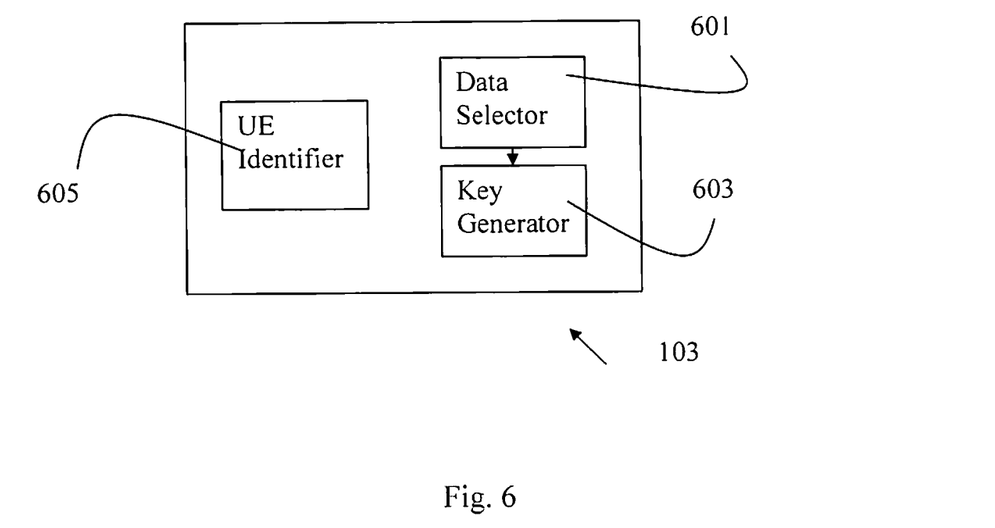
FIG. 6 is a view of a radio base station.

In FIG. 6 an exemplary radio base station 103 adapted to generate a transformed cryptographic radio base station key in accordance with the above is depicted. The radio base station comprises a module 601 for selecting data to be used when creating a cryptographic key or a Terminal identity Token in accordance with the above. The module 601 is connected to a module 603 adapted to generate a cryptographic key or a Terminal identity Token in accordance with the above. The exemplary radio base station 103 may also comprise an identifier module 605 adapted to identify a UE connecting to the radio base station using a Terminal Identity Token as described above.

Figure 7:
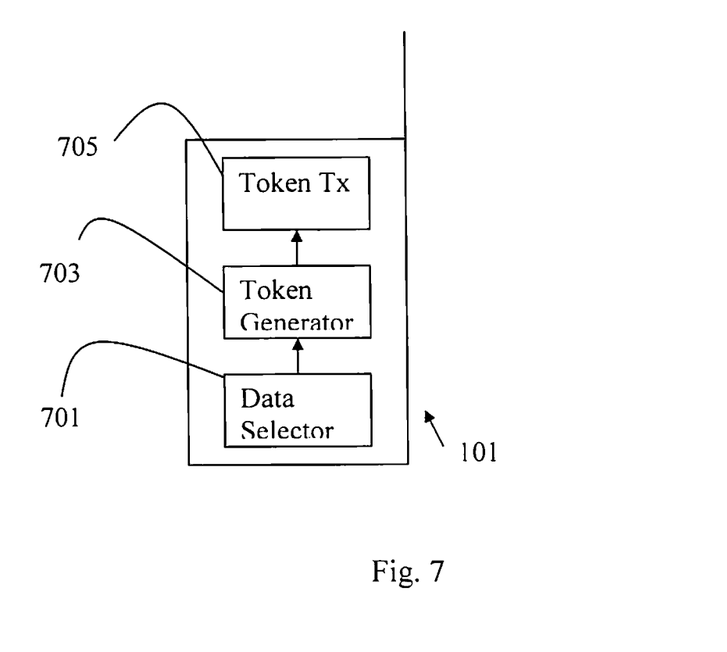
FIG. 7 is a view of a User Equipment.

In FIG. 7 an exemplary User Equipment (UE) 101 adapted to generate a Terminal Identity Token in accordance with the above is depicted. The UE comprises a module 701 for selecting data to be used when creating a Terminal identity Token in accordance with the above. The module 701 is connected to a module 703 adapted to generate a Terminal identity Token in accordance with the above. A Terminal Identity Token generated in the module 703 can be transmitted by a token transmitter 705 connected to the module 703.

Using the method and system as described herein will provide a more efficient procedure for providing secure communication in a cellular radio system both in a handover situation and in situations calling for authentication of a mobile station.

The invention claimed is:

1. A method of creating a derived radio base station key in a source radio base station of an Evolved Universal Mobile Telecommunications System Terrestrial Radio Access Network (E-UTRAN) cellular radio system in a connection with a User Equipment (UE) being connectable to the cellular radio system, said method comprising:
   determining, by the source radio base station, that a set of data comprises an E-UTRAN physical cell identity specific to a particular target cell associated with a target radio base station of the cellular radio system, said physical cell identity known to both the UE and the source radio base station;
   creating, by the source radio base station, the derived radio base station key based on the set of data and an existing cryptographic key used for communication between the UE and the source radio base station;
   transmitting, by the source radio base station, the derived radio base station key to the target radio base station, said derived radio base station key being used during a handover of the user equipment between the radio base station and the target radio base station or during a reconnection of the user equipment to the cellular radio system.

2. The method according to claim 1, further comprising using additional input parameters as input data when creating the derived radio base station key.

3. The method according to claim 1, further comprising creating the derived radio base station key using a Pseudo-Random Function.

4. A radio base station operative in an Evolved Universal Mobile Telecommunications System Terrestrial Radio Access Network (E-UTRAN) cellular radio system, the radio base station being adapted to create a derived radio base station key, the radio base station comprising:

a transmitter circuit and a receiver circuit configured to communicate with a User Equipment (UE);

wherein the radio base station is configured to:

determine, by the radio base station, a public E-UTRAN physical cell identity specific to a particular target cell associated with a target radio base station of the cellular radio system, said physical cell identity known to both the User Equipment (UE) communicating with the cellular radio system via a secure communication associated with an existing cryptographic key and the radio base station of the cellular radio system; and create, by the radio base station, the derived radio base station key based on the E-UTRAN physical cell identity and the existing key;

transmit, by the radio base station, the derived radio base station key to the target radio base station, said derived radio base station key being used during a handover of the user equipment between the radio base station and the target radio base station or during a reconnection of the user equipment to the cellular radio system.

5. The radio base station according to claim 4, wherein the radio base station is configured to use additional input parameters as input data when creating the derived radio base station key.

6. The radio base station according to claim 4, wherein the radio base station is configured to create the derived radio base station key using a Pseudo-Random Function.

* * * * *